United States Patent [19]

Vuilleumier

[11] 4,131,208
[45] Dec. 26, 1978

[54] FEED MECHANISM FOR CARTON BLANKS
[75] Inventor: Ralph O. Vuilleumier, Malvern, Pa.
[73] Assignee: Container Corporation of America, Chicago, Ill.
[21] Appl. No.: 821,351
[22] Filed: Aug. 3, 1977
[51] Int. Cl.² .............................................. B65G 59/00
[52] U.S. Cl. .................. 214/8.5 F; 271/125; 271/138
[58] Field of Search ............. 93/36 B; 214/8.5 A, 214/8.5 F, 8.5 H; 271/165, 169, 124, 125, 137, 138

[56] References Cited

U.S. PATENT DOCUMENTS

| | | | |
|---|---|---|---|
| 1,515,786 | 11/1924 | Wright et al. | 271/125 |
| 1,559,707 | 11/1925 | Jones | 214/8.5 F |
| 2,110,980 | 3/1938 | Swift, Jr. | 271/35 |
| 2,894,559 | 7/1959 | Eccher | 214/8.5 F X |
| 2,938,722 | 5/1960 | Luning | 271/165 X |
| 3,290,042 | 12/1966 | Johnson et al. | 271/138 |
| 3,961,785 | 6/1976 | Gall | 271/165 |

FOREIGN PATENT DOCUMENTS 2332034  9/1975  Fed. Rep. of Germany ........... 271/124

Primary Examiner—Leon Gilden
Attorney, Agent, or Firm—Carpenter & Ostis

[57] ABSTRACT

A feed mechanism for packing material such as carton blanks is disclosed. Blanks are arranged in a hopper where they are stacked between a pair of vertical members having their lower edges spaced above a support table for advancement of the bottommost blank by a shuttle into the feeding means. The spacing between one of the vertical members above the support is greater than the thickness of the blank and less than twice the thickness thereof and during feed movement a roller is biased against the feed blank to urge it against the bottom of a member. Thus a gate is provided between the bottom of a vertical member and the support.

7 Claims, 3 Drawing Figures

FEED MECHANISM FOR CARTON BLANKS

BACKGROUND OF THE INVENTION

The invention herein relates particularly to the individual feeding of blanks of paperboard or carton tubes, these presenting problems in feeding by reason of their flexibility, mass variable thickness and tendency to stick together when stacked.

SUMMARY OF THE INVENTION

According to the invention the blanks are fed individually from the bottom of a vertical stack by means of a shuttle movable with respect to a support table for the blanks and beneath the lower edge of a gate forming part of a hopper for the blanks. The shuttle advances the blank beneath the lower edge of a gate member and a biased roller below and adjacent the gate urges the lowermost blank toward a bottom of the gate member for subsequent feeding into a pair of nip rollers.

THE DRAWING

Figure 1:
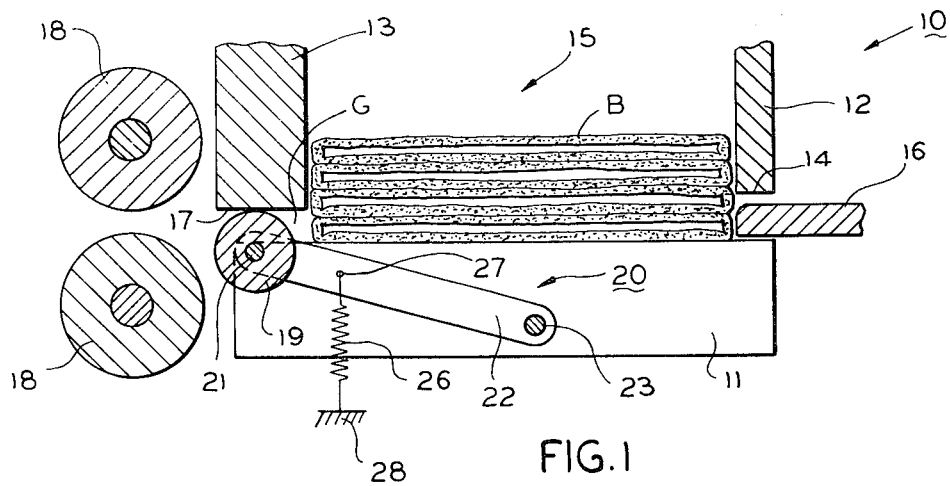
FIG. 1 is a schematic elevational view of the invention mechanism, showing same at the start of a feed operation.

The feed mechanism is denoted by the reference numeral 10 and includes support means comprising a table 11 for blanks B arranged horizontally in a vertical stack as shown. Blanks B are in this case of packaging material, namely, carton tubes.

The blanks B are stacked in a hopper 15 defined by a vertical wall member 12 and a vertical gate member 13. The wall 12 has a lower edge 14 spaced above the surface of support 11 and a shuttle 16 is movable in the space thus defined and across a portion of the support 11 to advance the lowermost blank B across the support 11.

Gate G is closed during the retracted or start position of shuttle 16 by a gate closing means 20 consisting of a roller 19 mounted on a stub 21 held at the end of an arm 22 having its other end pivoted at 23 within the support 11.

The gate closing roller 19 is biased to position against lower edge 17 of the gate member 13 by a spring 26 secured to the arm 22 at one end 27 and to an abutment 28. Contact of the roller 19 with edge 17 occurs when shuttle 16 is retracted as seen in FIG. 1. When the blank is advanced into the gate G, the roller 19 is depressed and urges the blank toward the edge 17 so that only one blank can pass through at a given time to the feeding means comprising the feed rollers 18.

Figure 2:
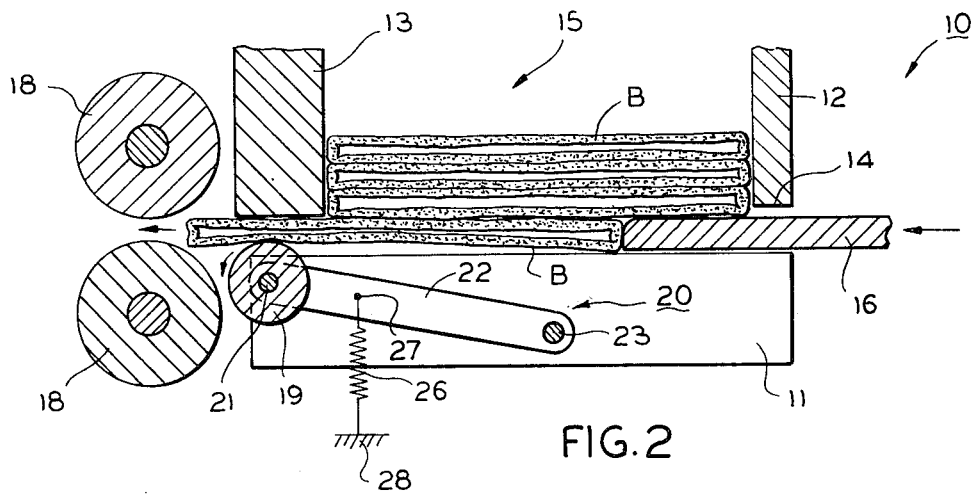
FIG. 2 is a similar view showing the feed operation partly completed.

As seen in FIG. 2, as the shuttle 16 advances, the lowermost blank B is forced through the gate G, roller 19 yielding during such movement. The blank B then advances into the nip of feed rollers 18,18. In such movement the blank B is urged against the lower edge 17 of the gate G.

The distance between the lower edge 17 of the gate member 13 and the upper surface of the support 11 immediately below it forming the gate G, is greater than the thickness of a single blank B shown in the drawing, but less than twice the thickness of such blank. This feature prevents two blanks from passing through the gate at the same time.

Figure 3:
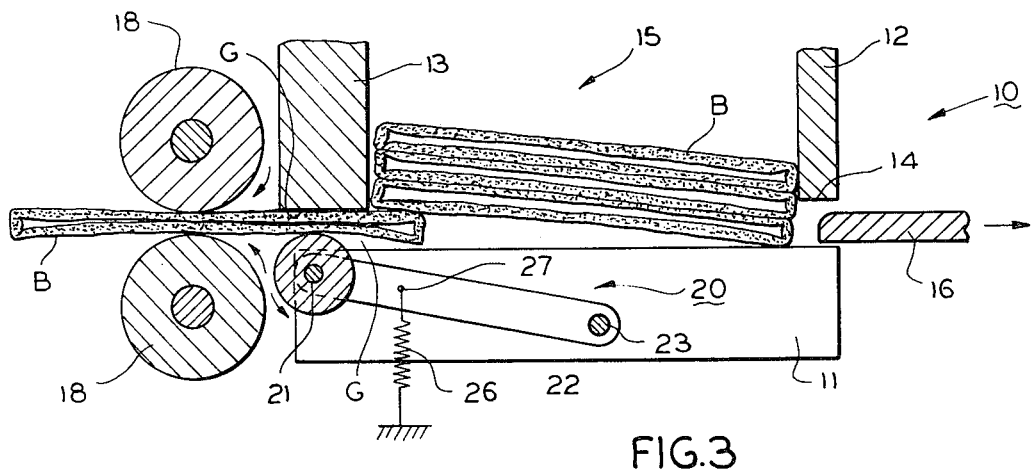
FIG. 3 is a similar view showing the feed operation substantially completed.

As the trailing end of lowermost blank B commences its movement through the gate G and the shuttle 16 is retracted to a start position, the remaining blanks of the stack are canted as seen in FIG. 3, then dropped back to the start position seen in FIG. 1. The blanks are thus jogged to facilitate separation in subsequent operation.

I claim:

1. In a feeding mechanism for delivering packaging forming material, such as folded carton blanks, without jamming, from a hopper toward a carton erecting mechanism, the combination of:
    (a) a hopper containing a plurality of folded carton blanks arranged in a stack;
    (b) support means located adjacent said hopper and having a surface extending in a plane generally parallel to the plane of movement of a blank moving means;
    (c) a gate member positioned at the discharge end of said hopper and having an edge spaced from said support means;
    (d) said blank moving means engageable with the outermost blank of said stack for moving said blank over said support means toward said gate member;
    (e) biased metering means located below and adjacent said gate member edge for engaging the outside of said outermost blank only, as it passes by said gate member, and sufficiently biased to urge it snugly against said edge to prevent an adjacent blank from entering between said gate member and said outermost blank.

2. In a mechanism as defined in claim 1, wherein said metering means adjacent said gate member surface includes a pressure biased roller.

3. In a mechanism as defined in claim 2, wherein said roller is biased by spring means.

4. In a mechanism as defined by claim 3, wherein said spring means includes a spring actuated arm carrying said roller.

5. In a mechanism as defined in claim 4, wherein said arm is pivotally mounted on said support means.

6. In a mechanism as defined in claim 1, where said blank moving means includes a shuttle movable adjacent at least a part of said support means.

7. In a mechanism as defined in claim 1, wherein said support means is located directly under said hopper.

* * * * *